US012597740B2

(12) United States Patent
Kim et al.

(10) Patent No.: US 12,597,740 B2
(45) Date of Patent: Apr. 7, 2026

(54) CONNECTOR ASSEMBLY INCLUDING RECEPTACLE CONNECTOR AND PLUG CONNECTOR, AND PLUG CONNECTOR

(71) Applicants: Sensorview Co., LTD., Seongnam-si (KR); Okins Electronics Co., LTD., Uiwang-si (KR)

(72) Inventors: Byoung Nam Kim, Bucheon-si (KR); Kyoung Il Kang, Suwon-si (KR); Joung Min Park, Osan-si (KR); Sung Cheol Cho, Incheon (KR); Jin Kook Jun, Gunpo-si (KR); Sung Gyu Park, Anyang-si (KR); Jong Wook Ham, Gunpo-si (KR)

(73) Assignees: SENSORVIEW CO., LTD. (KR); OKINS ELECTRONICS CO., LTD. (KR)

( * ) Notice: Subject to any disclaimer, the term of this patent is extended or adjusted under 35 U.S.C. 154(b) by 333 days.

(21) Appl. No.: 18/261,686

(22) PCT Filed: Jan. 11, 2022

(86) PCT No.: PCT/KR2022/000420
§ 371 (c)(1),
(2) Date: Jul. 17, 2023

(87) PCT Pub. No.: WO2022/154419
PCT Pub. Date: Jul. 21, 2022

(65) Prior Publication Data

US 2024/0322497 A1 Sep. 26, 2024

(30) Foreign Application Priority Data

Jan. 18, 2021 (KR) ........................ 10-2021-0006557

(51) Int. Cl.
*H01R 13/6585* (2011.01)
*H01R 12/75* (2011.01)

(52) U.S. Cl.
CPC ......... *H01R 13/6585* (2013.01); *H01R 12/75* (2013.01)

(58) Field of Classification Search
CPC ........ H01R 12/75; H01R 12/79; H01R 13/24; H01R 13/6582; H01R 13/6585; H01R 13/6593
See application file for complete search history.

(56) References Cited

U.S. PATENT DOCUMENTS 6,893,291 B2 * 5/2005 Wendling ............. H01R 9/0518 439/585
10,797,412 B2 * 10/2020 Barthelmes .......... H01R 9/0527
(Continued)

FOREIGN PATENT DOCUMENTS

CN 108682990 A 10/2018
CN 112086784 12/2020
(Continued)

OTHER PUBLICATIONS

Japanese Office Action dated Jul. 2, 2024 received in related matter 2023-542647; 3 pages.
(Continued)

*Primary Examiner* — Abdullah A Riyami
*Assistant Examiner* — Thang H Nguyen
(74) *Attorney, Agent, or Firm* — Cislo & Thomas, LLP

(57) ABSTRACT

A connector assembly having a receptacle connector and a plug connector coupled thereto. The plug connector includes: a signal pin having one side in electrical contact with a signal line of a cable and the other side in elastic contact with a clip pin of the receptacle connector; a shield can enclosing the signal pin; a first insulating member
(Continued)

coupled to the signal pin; and a plug shell enclosing an upper surface and a side surface of the shield can. The receptacle connector includes: a clip pin having a lower portion contacting a signal pad of a circuit board and an upper portion in elastic contact with the other side of the signal pin; a receptacle base installed on the circuit board and providing a space for the clip pin; and a second insulating member coupled to the clip pin and enclosing the side surfaces of the clip pin.

8 Claims, 12 Drawing Sheets

(56) References Cited

U.S. PATENT DOCUMENTS

| | | | | |
|---|---|---|---|---|
| 2009/0104800 | A1 * | 4/2009 | Scherer | H01R 13/6471 439/101 |
| 2009/0191729 | A1 * | 7/2009 | Kurimoto | H01R 13/02 439/652 |
| 2010/0144199 | A1 * | 6/2010 | Wu | H01R 9/0515 439/607.41 |
| 2010/0184330 | A1 * | 7/2010 | Wu | H01R 13/65918 439/607.28 |
| 2011/0151708 | A1 * | 6/2011 | Kaneko | H01R 12/714 439/660 |
| 2016/0043430 | A1 * | 2/2016 | Lee | H01M 4/13 429/304 |
| 2018/0115095 | A1 * | 4/2018 | Zhu | H01R 12/592 |
| 2021/0367367 | A1 * | 11/2021 | Kim | H01R 13/6581 |
| 2024/0372301 | A1 * | 11/2024 | Lim | H01R 13/6275 |

FOREIGN PATENT DOCUMENTS

| | | | | |
|---|---|---|---|---|
| JP | 3134082 | | 2/2001 | |
| JP | 2003243103 | A | 8/2003 | |
| JP | 2006344524 | | 12/2006 | |
| JP | 2006344524 | A | 12/2006 | |
| JP | 2007265908 | | 10/2007 | |
| JP | 2017174588 | | 9/2017 | |
| JP | 2019151985 | | 9/2019 | |
| JP | 2020205255 | A | 12/2020 | |
| KR | 101027916 | | 4/2011 | |
| KR | 20140001479 | | 3/2014 | |
| KR | 101586431 | | 1/2016 | |
| KR | 101586431 | B1 | 1/2016 | |
| KR | 20170049390 | | 5/2017 | |
| WO | WO-2022208247 | A1 * | 10/2022 | H01R 13/6583 |

OTHER PUBLICATIONS

Japanese Office Action dated Jun. 25, 2024 received in related matter 2023-542648; 3 pages.

* cited by examiner

CONNECTOR ASSEMBLY INCLUDING RECEPTACLE CONNECTOR AND PLUG CONNECTOR, AND PLUG CONNECTOR

TECHNICAL FIELD

The present invention relates to an electrical connector, and more particularly, to a connector assembly including a receptacle connector and a plug connector, and a plug connector.

BACKGROUND ART

In various types of electronic devices (e.g., wired/wireless communication devices), an internal circuit is provided on a circuit board. A connector assembly including a receptacle connector and a plug connector is used to connect the circuit board to other electronic devices or other circuit boards. The receptacle connector is mounted on the circuit board, the plug connector is coupled to a cable, and the plug connector is connected to the receptacle connector, so that the cable and the circuit board are electrically connected.

Such connector assemblies are also widely used in high-speed wireless communication devices, such as 5G devices, and high electromagnetic wave shielding performance is required as the frequency increases. However, conventional connector assemblies do not exhibit electromagnetic wave shielding performance as required at high frequencies, and are vulnerable to electromagnetic wave interference between cables and signal pins, especially when the multiple cables are simultaneously connected to a circuit board with a single connector.

DETAILED DESCRIPTION OF THE INVENTION

Technical Problem

An object of the present invention is to provide a connector assembly that has excellent electromagnetic wave shielding performance and minimizes electromagnetic interference between cables and signal pins within a connector while simultaneously connecting the multiple cables to a circuit board, and a plug connector.

The objects to be achieved by the present invention are not limited to the foregoing object, and additional objects, which are not mentioned herein, will be readily understood by those skilled in the art from the following description.

Technical Solution

A connector assembly according to the present invention for achieving the above object includes a receptacle connector and a plug connector vertically coupled to the receptacle connector, the plug connector including: a signal pin having one side in electrical contact with a signal line of a cable and the other side in elastic contact with a clip pin of the receptacle connector; a shield can formed to enclose the signal pin such that the other side of the signal pin is exposed downwards and to be electrically spaced apart from the signal pin; a first insulating member coupled to the signal pin to insulate between the signal pin and the shield can; and a plug shell which has an open lower portion and encloses an upper surface and a side surface of the shield can to expose the other side of the signal pin downwards, the receptacle connector including: a clip pin which has a lower portion in contact with a signal pad of a circuit board and an upper portion in elastic contact with the other side of the signal pin; a receptacle base which is formed to be installed on the circuit board and provides a space in which the clip pin is accommodated; and a second insulating member to which the clip pin is coupled and which encloses the side surfaces of the clip pin to insulate between the clip pin and the receptacle base.

The shield can may include a lower shield can having a lower seating groove that forms a space in which a lower portion of the cable is seated and the one side of the signal pin is disposed and an upper shield can having an upper seating groove in which an upper portion of the cable is seated and which forms, together with the lower seating groove, a space in which the one side of the signal pin is disposed.

The signal pin may include first and second signal pins arranged in parallel with each other, the first insulating member may include 1-1$^{st}$ and 1-2$^{nd}$ insulating members respectively corresponding to the first and second signal pins, the lower seating groove may include first and second lower seating grooves respectively corresponding to the first and second signal pins, and the upper seating groove may include first and second upper seating grooves respectively corresponding to the first and second lower seating grooves.

The lower shield can may include a vertical through hole disposed between the first and second lower seating grooves, and the upper shield can may include a first protruding portion that protrudes downward to be inserted into the through hole.

The upper shield can may include a second protruding portion that protrudes downward to be disposed between the other side of the first signal pin and the other side of the second signal pin.

The shield can, the plug shell, and the receptacle base may be formed of a metal material.

The clip pin may include first and second clip pins respectively corresponding to the first and second signal pins, the second insulating member may include 2-1$^{st}$ and 2-2$^{nd}$ insulating member respectively corresponding to the first and second clip pins, and the receptacle base may include a shielding wall disposed between the 2-1$^{st}$ and 2-2$^{nd}$ insulating members.

The shielding wall may be formed such that a lower surface thereof is in electrical contact with a ground pad of the circuit board.

The receptacle connector may further include an elastic portion which is attached along a portion of a surface of the receptacle base that faces the shield can and the plug shell, is formed of metal or a shielding resin material, and has elasticity.

The elastic portion may include a plurality of cut elastic pieces at a portion facing the shield can and the plug shell.

The receptacle base may include a plurality of coupling grooves on a lateral surface thereof, and the plug shell may include a plurality of elastic coupling portions on a lateral surface thereof that are elastically inserted into the coupling grooves, respectively.

A plug connector according to the present invention for achieving the above object is vertically coupled to a receptacle connector and includes: a signal pin having one side in electrical contact with a signal line of a cable and the other side in elastic contact with a clip pin of the receptacle connector; a shield can formed to enclose the signal pin such that the other side of the signal pin is exposed downwards and to be electrically spaced apart from the signal pin; a first insulating member coupled to the signal pin to insulate between the signal pin and the shield can; and a plug shell which has an open lower portion and encloses an upper surface and a side surface of the shield can to expose the other side of the signal pin downwards.

Advantageous Effects

A plug connector and a connector assembly according to embodiments of the present invention show excellent electromagnetic wave shielding performance and minimize electromagnetic wave interference between cables and signal pins within the connector while simultaneously connecting the multiple cables and a circuit board.

Effects of the present invention are not limited to the foregoing effects, and additional effects, which are not mentioned herein, will be readily understood by those skilled in the art from the following description.

MODE FOR INVENTION

Figure 1A:
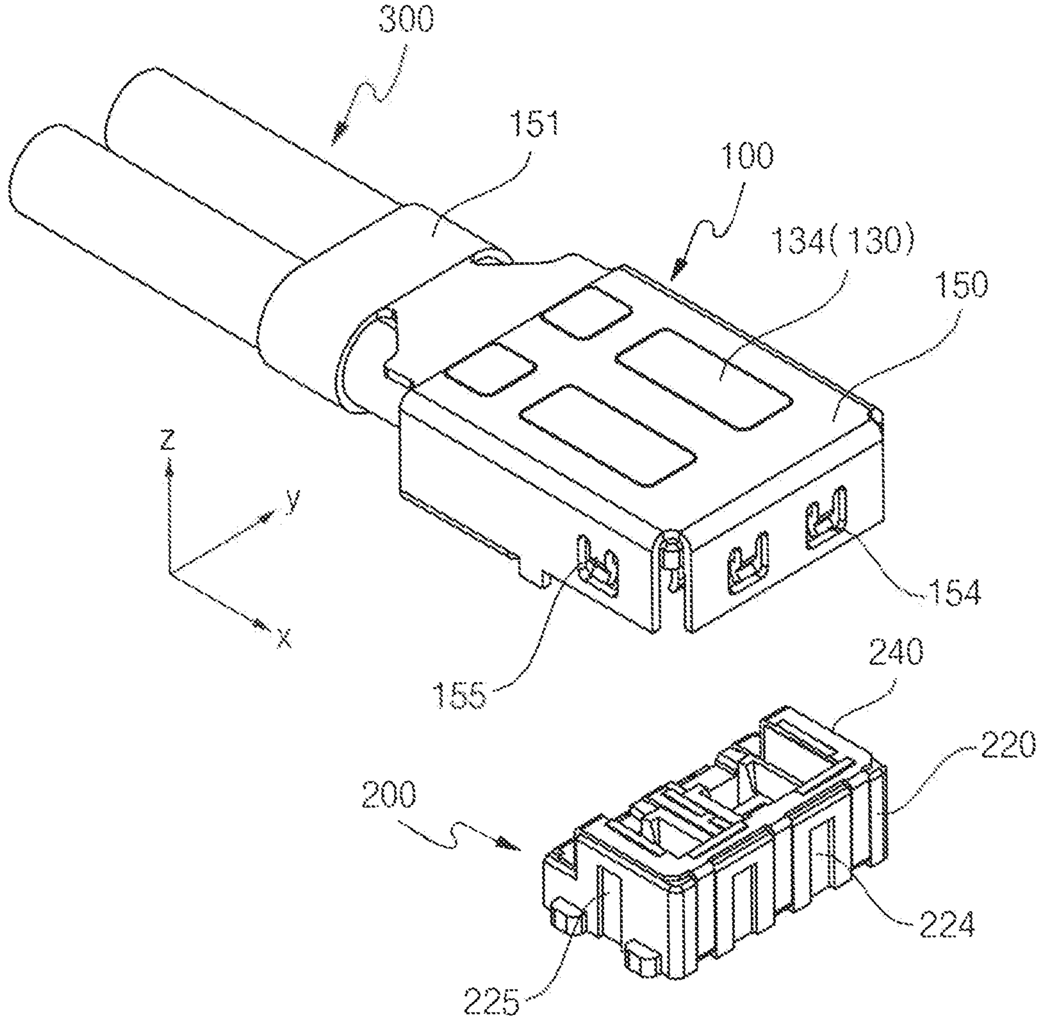
FIG. 1A is a perspective view of one side of a connector assembly according to an embodiment of the present invention.

Hereinafter, exemplary embodiments of the present invention will be described in detail with reference to the drawings. In the present specification, reference now should be made to the drawings, in which the same reference numerals are used throughout the different drawings to designate the same or similar components. Further, in the description of the present invention, detailed descriptions of related well-known functions or configurations that are determined to unnecessarily obscure the gist of the present invention will be omitted.

Figure 1B:
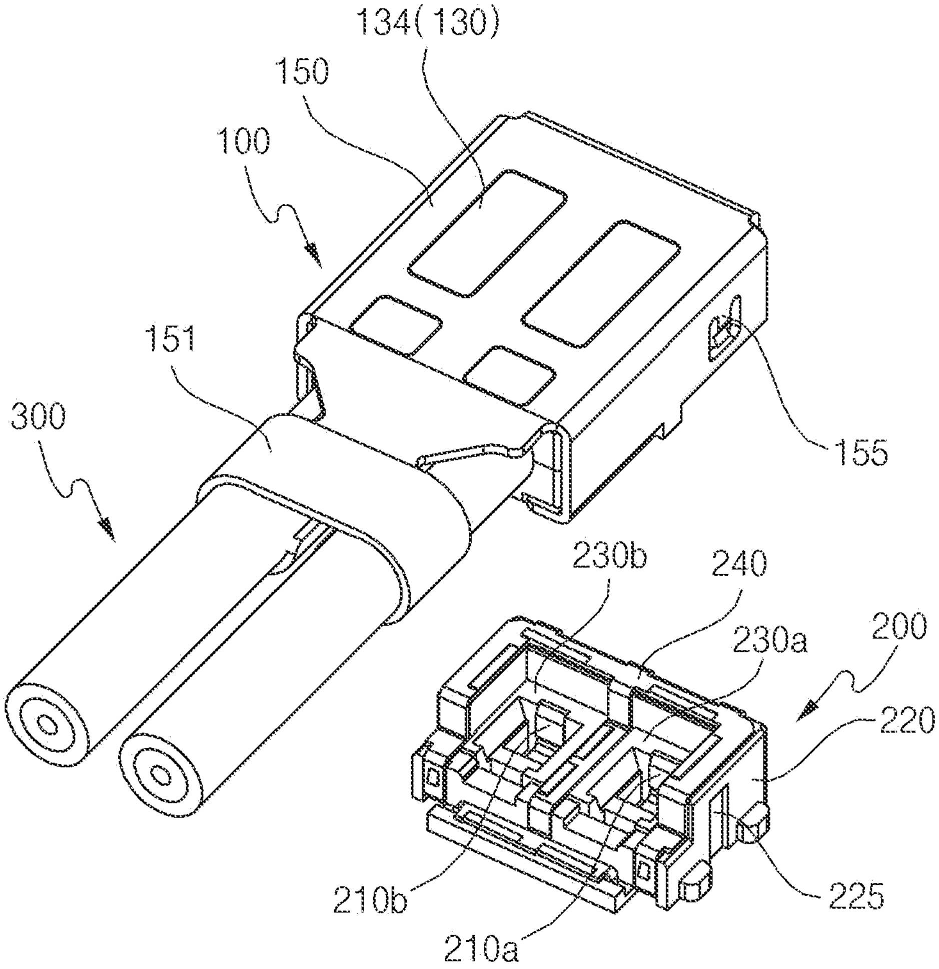
FIG. 1B is a perspective view of the connector assembly of FIG. 1A as viewed from another side.
Figure 1C:
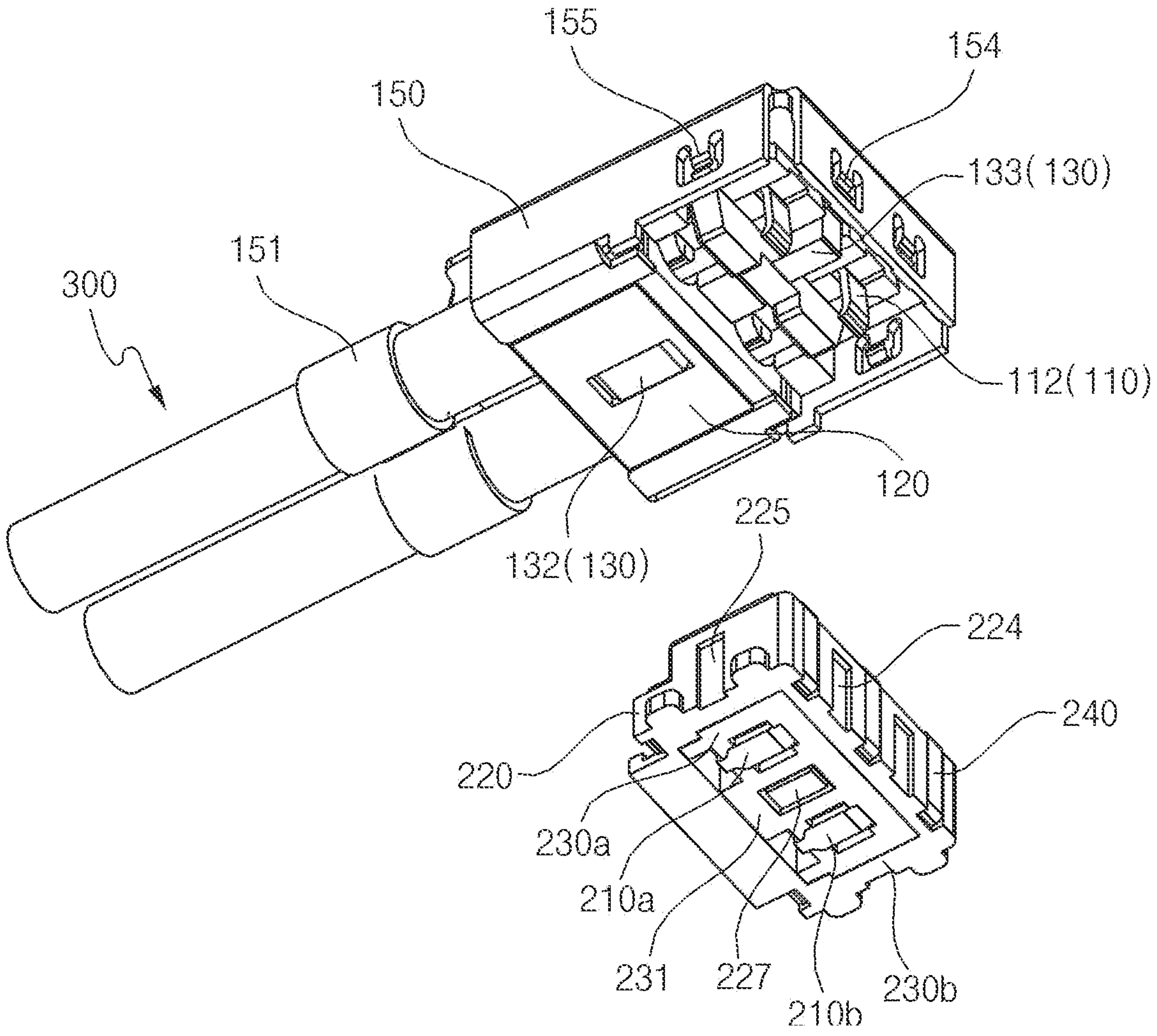
FIG. 1C is a perspective view of the connector assembly of FIG. 1A as viewed from still another side.

FIGS. 1A to 1C are views of a connector assembly according to an embodiment of the present invention. In this specification, for convenience of description, with respect to FIG. 1A, the positive X-axis direction is defined as a forward direction (or a front side or a front end) and the negative X-axis direction is a rearward direction (or a rear side or a rear end). The positive Z-axis direction is defined as an upper direction (or an upper surface or an upper end) and the negative Z-axis direction is a lower direction (or a lower surface or a lower end). The positive and negative Y-axis directions are defined as a lateral direction. FIG. 1A is a perspective view of the connector assembly as viewed from the upper front side thereof, FIG. 1B is a perspective view of the connector assembly as viewed from the upper rear side thereof, and FIG. 1C is a perspective view of the connector assembly as viewed from the lower rear side thereof.

The connector assembly according to the present embodiment includes a receptacle connector 200 mounted on a circuit board (P in FIG. 4C) and a plug connector 100 coupled to the cable 300 and vertically coupled to the receptacle connector 200.

The receptacle connector 200 may be mounted on the circuit board P by a surface mounting (surface mount device (SMD)/surface mount technology (SMT)) method, a single in-line package (SIP) method, a dual in-line package (DIP) method, or a quad in-line package (QIP) method, or may be mounted by selectively using the surface mounting method and a penetration method. Depending on an embodiment, the receptacle connector 200 may not be a separate component but may be integrally formed with the circuit board P.

Figure 2A:
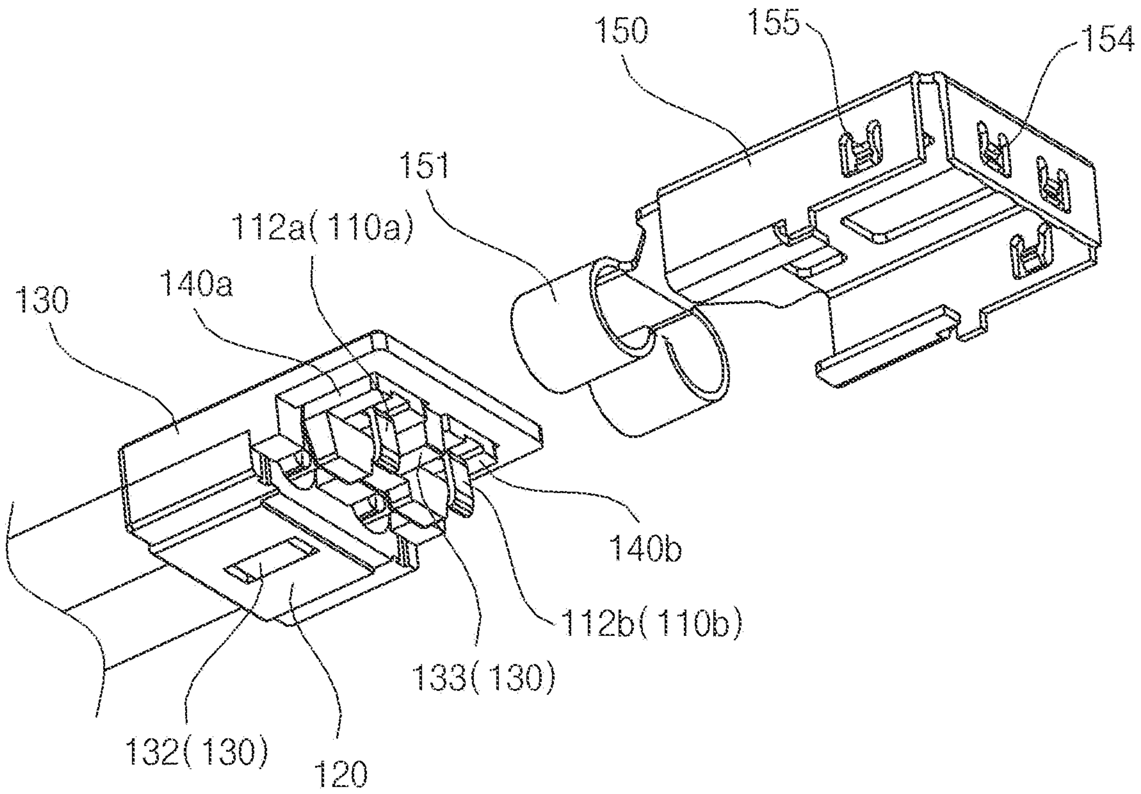
FIG. 2A is a first exploded view of a plug connector according to an embodiment of the present invention.
Figure 2B:
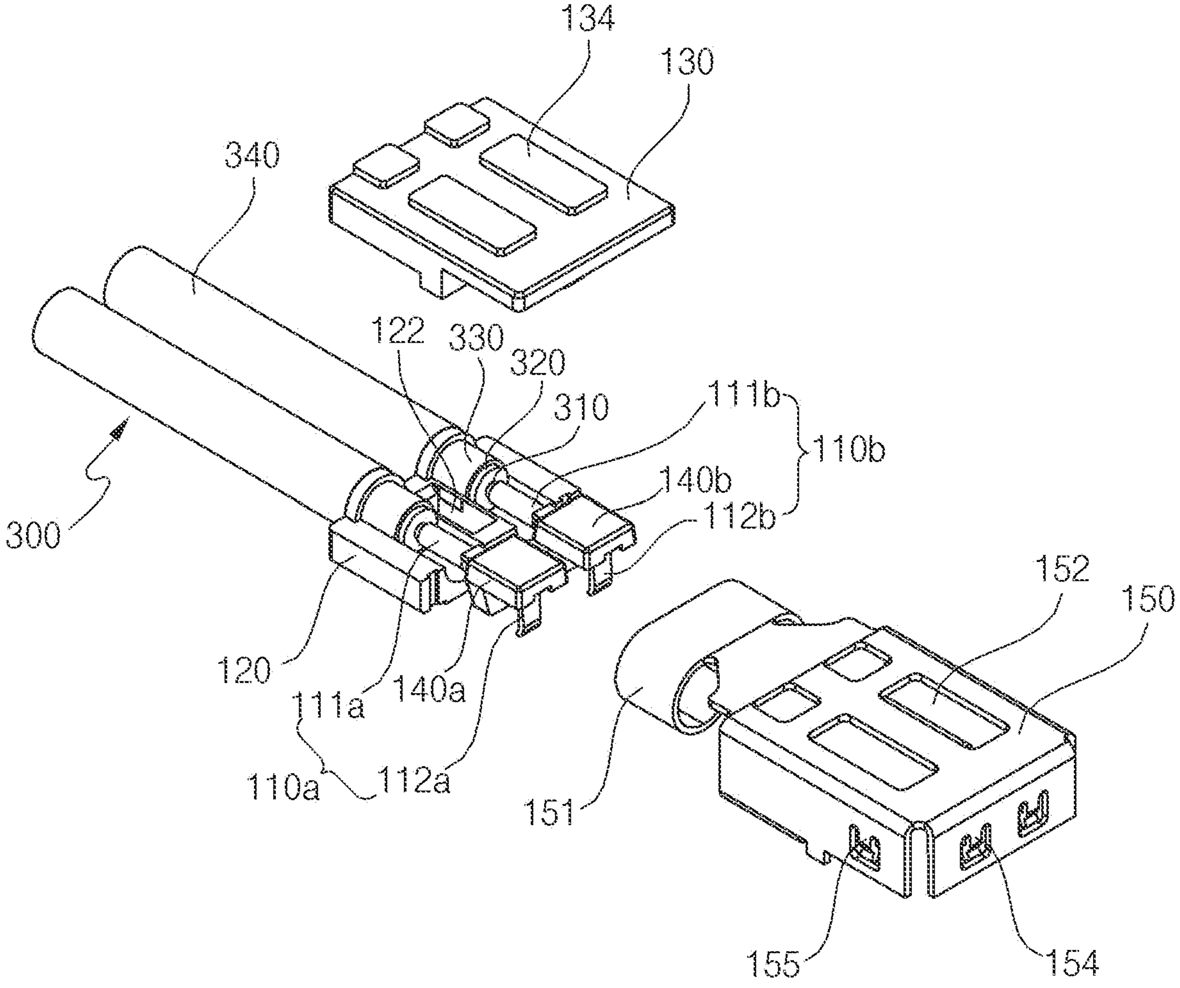
FIG. 2B is a second exploded view of a plug connector according to an embodiment of the present invention.
Figure 2C:
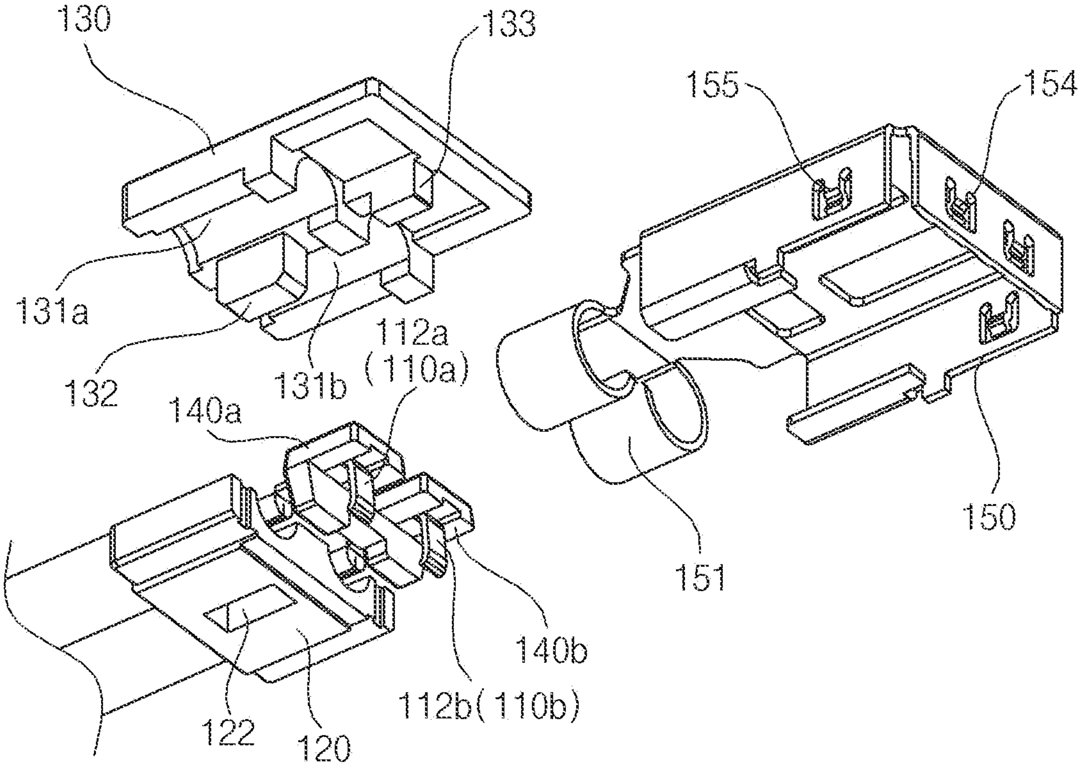
FIG. 2C is the second exploded view of the plug connector of FIG. 2B as viewed from another side.
Figure 2D:
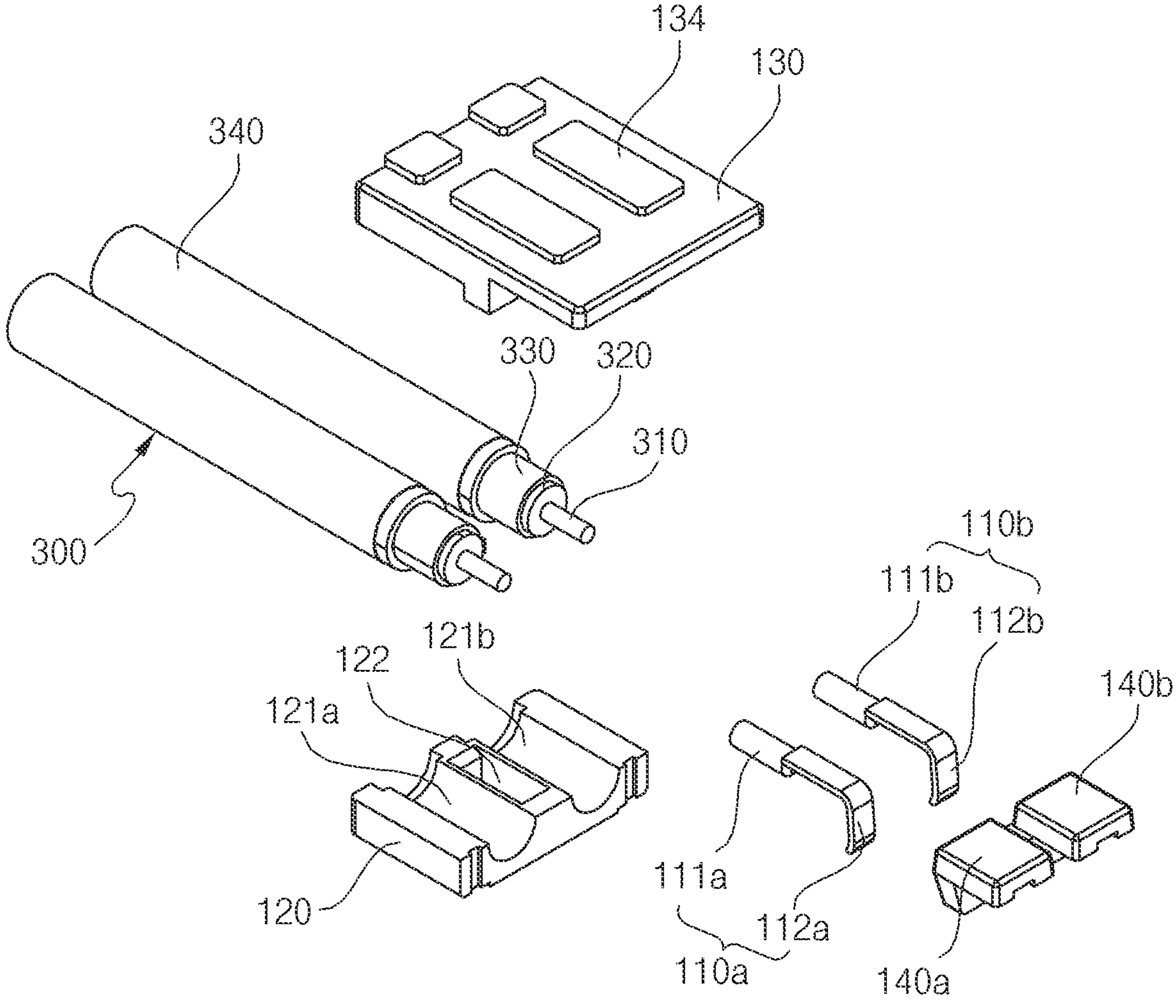
FIG. 2D is a third exploded view of a plug connector according to an embodiment of the present invention.

FIGS. 2A to 2C are views of the plug connector 100 according to an embodiment of the present invention. FIG. 2A is a first exploded view of the plug connector 100 as viewed from the lower front side thereof, FIG. 2B is a second exploded view of the plug connector 100 as viewed from the upper front side thereof, FIG. 2C is the second exploded view of the plug connector 100 of FIG. 2B as viewed from the lower front side thereof, and FIG. 2D is a third exploded view of the plug connector 100 as viewed from the upper front side thereof.

In the present embodiment, a coaxial cable is described as an example of the cable 300 coupled to the plug connector 100, but the cable 300 may be of various types, such as a data cable, a wire, a flexible flat cable (FFC), a flexible printed circuit (FPC), or the like, rather than a coaxial cable.

The cable 300 may include a signal line (internal conductor) 310, an outer conductor 330 configured to shield electromagnetic waves of the signal line 310 and made of aluminum, copper, or the like, a dielectric 320 configured to insulate and separate between the signal line 310 and the outer conductor 330, and a sheath (jacket) 340 configured to protect the outer conductor 330.

The plug connector 100 includes first and second signal pins 110*a* and 110*b*, shield cans 120 and 130, 1-$1^{st}$ and 1-$2^{nd}$ insulating members 140*a* and 140*b*, and a plug shell 150.

In the present embodiment, two cables 300 are described by way of example, there may be provided one cable 300 or three or more cables. In the case of a plurality of cables 300, the cables 300 may be arranged in parallel with one another. Those skilled in the art will understand that the number or structure of the first and second signal pins 110*a* and 110*b*, the shield cans 120 and 130, the 1-$1^{st}$ and 1-$2^{nd}$ insulating members 140*a* and 140*b*, and the plug shells 150 may be appropriately modified according to the number of cables 300.

The first and second signal pins 110*a* and 110*b* are respectively provided for the cables 300, and like the cables 300, the first and second signal pins 110*a* and 110*b* are also arranged in parallel with each other. The first and second signal pins 110*a* and 110*b* may respectively include rear portions 111*a* and 111*b* and front portions 112*a* and 112*b* formed integrally with the rear portions 111*a* and 111*b*, respectively. The rear portions 111*a* and 111*b* are formed to be in electrical contact with the signal lines 310. For example, the rear portions 111*a* and 111*b* may each include an insertion portion into which the signal line 310 is inserted, and the rear portions 111*a* and 111*b* may each be in electrical contact with the signal line 310 with constriction, soldering, or the like. The front portions 112*a* and 112*b* are formed to be in elastic contact respectively with first and second clip pins 210*a* and 210*b* of the receptacle connector 200 which will be described below. For example, the front portions 112*a* and 112*b* may each be generally formed in an inverted "L" shape.

The shield cans 120 and 130 are configured to enclose the first and second signal pins 110*a* and 110*b* such that the front portions 112*a* and 112*b* of the first and second signal pins 110*a* and 110*b* are exposed downwards, and to be electrically spaced apart from the first and second signal pins 110*a* and 110*b*. The shield cans 120 and 130 may be formed of a metal material to shield electromagnetic waves. The shied cans 120 and 130 may include a lower shield can 120 and an upper shield can 130. The lower shield can 120 may include first and second lower seating grooves 121*a* and 121*b* forming spaces in which lower portions of the cables 300 are seated and the rear portions 111*a* and 111*b* of the first and second signal pins 110*a* and 110*b* are disposed, respectively. The upper shield can 130 may be configured to cover the lower shield can 120 and may include first and second upper seating grooves 131*a* and 131*b* forming spaces in which upper portions of the cables 300 are seated and the rear portions 111*a* and 111*b* of the first and second signal pins 110*a* and 110*b* are disposed, respectively. The upper shield can 130 may be formed to be longer in the forward direction than the lower shield can 120 so as to cover the front portions 112*a* and 112*b* of the first and second signal pins 110*a* and 110*b*. In the present embodiment, the shield cans 120 and 130 are described as being formed by coupling the lower shield can 120 and the upper shield can 130, but the shield cans 120 and 130 may be integrally formed as a unitary unit.

The lower shield can 120 may include a vertical through hole 122 disposed between the first and second lower seating grooves 121*a* and 121*b*, and the upper shield can 130 may include a first protruding portion protruding downwards to be inserted into the through hole 122. The first protruding portion 132 may serve to shield between the adjacent cables 300 and between the rear portion 111*a* of the first signal pin 110*a* and the rear portion 111*b* of the second signal pin 110*b*.

In addition, the upper shield can 130 may include a second protruding portion protruding downward to be disposed between the front portion 112*a* of the first signal pin and the front portion 112*b* of the second signal pin 110*b*. The second protruding portion 133 may serve to shield between the front portion 112*a* of the first signal pin 110*a* and the front portion 112*b* of the second signal pin 110*b*. Depending on an embodiment, the shield cans 120 and 130 and the outer conductors 330 of the cables 300 may be coupled to each other by soldering.

The 1-1$^{st}$ and 1-2$^{nd}$ insulating members 140*a* and 140*b* are coupled to the first and second signal pins 110*a* and 110*b* to insulate the first and second signal pins 110*a* and 110*b* from the shield cans 120 and 130. The 1-1$^{st}$ and 1-2$^{nd}$ insulating members 140*a* and 140*b* may include through holes through which the front portions 112*a* and 112*b* of the first and second signal pins 110*a* and 110*b* pass, respectively, and may be formed to cover upper portions of the front portions 112*a* and 112*b* of the first and second signal pins 110*a* and 110*b* while exposing lower portions. The 1-1$^{st}$ and 1-2$^{nd}$ insulating members 140*a* and 140*b* may be integrally formed by a connecting portion therebetween.

The plug shell 150 may be formed to have an open lower portion and surround the upper surfaces and both lateral surfaces of the shield cans 120 and 130 so that the front portions 112*a* and 112*b* of the first and second signal pins 110*a* and 110*b* are exposed downwards. The plug shell 150 may be made of a metal material to shield electromagnetic waves. Also, the plug shell 150 may include a wrapping portion 151 that surrounds and supports a portion of the cable 300 exposed from the rear of the shield cans 120 and 130 to the outside of the shield cans 120 and 130. The wrapping portion 151 may extend rearward from the top of the plug shell 150. The wrapping portion 151 may prevent damage to the cable 300 due to excessive bending or dislodging. In addition, a plurality of protruding portions 134 may be formed on an upper surface of the upper shield can 130 and through holes 152 that correspond to the protruding portions 134 may be formed on the top of the plug shell 150 so that the plug shell 150 and the upper shield can 130 can be tightly coupled to each other as the protruding portions 134 are inserted into the through holes 152. Depending on an embodiment, an additional shell that covers the plug shell 150 may be provided to improve shielding performance or increase reliability with respect to vibration. In addition, although in the present embodiment it is illustrated that there are gaps between the front surface and the lateral surfaces of the plug shell 150, the lateral surfaces may be extended and bent toward the front surface such that a portion of the front surface may be surrounded by the extended bent portions according to an embodiment.

With the plug connector 100 according to an embodiment of the present invention, electromagnetic waves generated through the signal lines 310 and the outer conductors 330 of the cables 300, and the signal pins 110, may be primarily shielded by the shield cans 120 and 130, and secondarily shielded by the plug shell 150. Thus, the electromagnetic shielding performance is improved. Further, electromagnetic waves between the adjacent signal lines 310 or between the adjacent first and second signal pins 110*a* and 110*b* are shielded by the first protruding portion 132 and the second protruding portion 133 of the shield cans 120 and 130, so that interference between signals can be minimized.

Figure 3A:
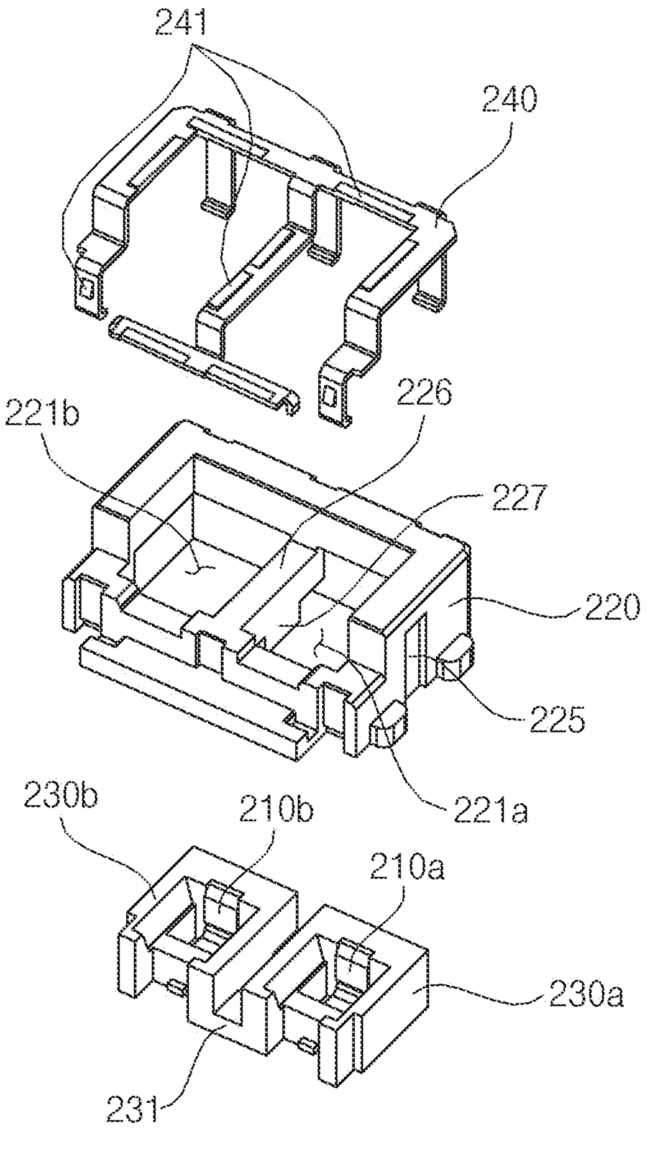
FIG. 3A is an exploded view of a receptacle connector according to one embodiment of the present invention.
Figure 3B:
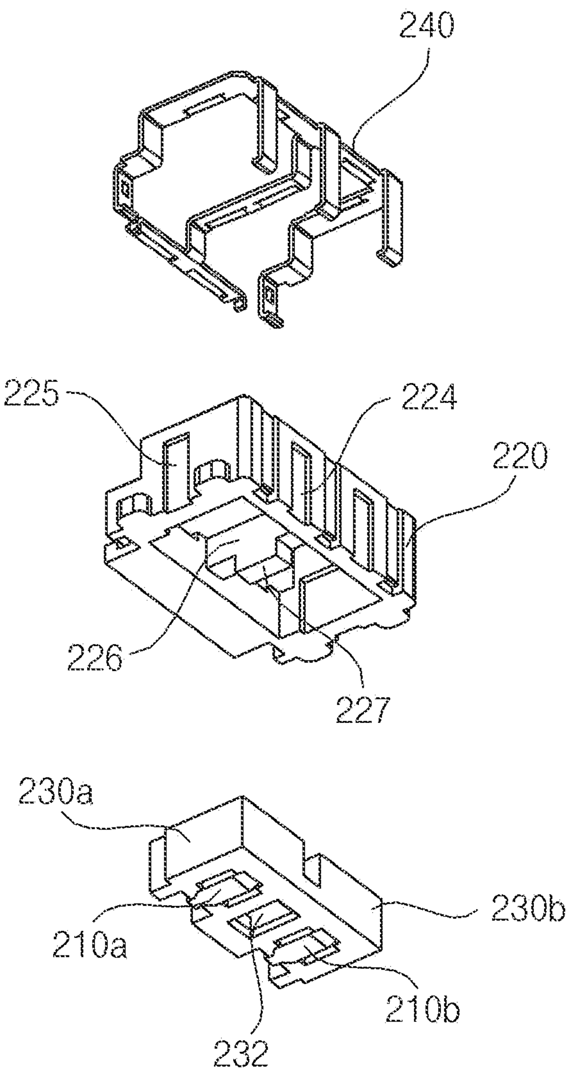
FIG. 3B is the exploded view of the receptacle connector of FIG. 3A as viewed from another side.

FIGS. 3A to 3B are views of the receptacle connector 200 according to an embodiment of the present invention. FIG. 3A is an exploded view of the receptacle connector 200 as viewed from the upper front side thereof, and FIG. 3B is the exploded view of the receptacle connector 200 of FIG. 3A as viewed from the lower front side thereof.

The receptacle connector 200 includes first and second clip pins 210*a* and 210*b*, a receptacle base 220, 2-1$^{st}$ and 2-2$^{nd}$ insulating members 230*a* and 230*b*, and an elastic portion 240.

The first and second clip pins 210*a* and 210*b* may be formed such that lower surfaces thereof are in elastic contact or in electrical contact, by soldering or the like, with a signal pad (not shown) of the circuit board (P in FIG. 4C) and upper surfaces thereof are in elastic contact with the front portions 112*a* and 112*b* of the first and second signal pins 110*a* and 110*b*, respectively. For example, the first and second clip pins 210*a* and 210*b* may each be generally formed in an "L" shape. Depending on an embodiment, the first and second clip pins 210*a* and 210*b* may be in electrical contact with the signal pad of the circuit board P by an SMD/SMT method, an SIP method, a DIP method, or a QIP method.

The receptacle base 220 may be configured to be installed on an upper surface of the substrate P and provide first and second spaces 221*a* and 221*b* in which the 2-1$^{st}$ and 2-2$^{nd}$ insulating members 230*a* and 230*b* and the first and second clip pins 210*a* and 210*b* are accommodated. The first and second spaces 221*a* and 221*b* may be formed to pass through the top and bottom of the receptacle base 220. The receptacle base 220 may be made of a metal material for electromagnetic wave shielding and grounding purpose.

The 2-1$^{st}$ and 2-2$^{nd}$ insulating members 230*a* and 230*b* are respectively inserted into the first and second spaces 221*a* and 221*b* of the receptacle base 220 and insulate between the first and second clip pins 210*a* and 210*b* and the receptacle base 220 while fixing the first and second clip pins 210*a* and 210*b* by enclosing them from lateral surfaces thereof. The 2-1$^{st}$ and 2-2$^{nd}$ insulating members 230*a* and 230*b* may be integrally formed by a connecting portion 231 therebetween.

The receptacle base 220 may include a shielding wall 226 that is disposed between the 2-1$^{st}$ and 2-2$^{nd}$ insulating members 230*a* and 230*b* and defines the first and second spaces 221*a* and 221*b*. The shielding wall 226 may serve to shield between the first and second clip pins 210*a* and 210*b*. A vertically penetrating hole 232 may be formed on the connecting portion 231 between the 2-1$^{st}$ and 2-2$^{nd}$ insulating members 230*a* and 230*b*. In addition, the shielding wall 226 may include a protruding portion 227 that is inserted into the hole 232 and has a lower surface generally coplanar with the lower surface of the receptacle base 220. The protruding portion 227 may be in electrical contact with a ground pad (not shown) of the circuit board P (e.g., by soldering or the like). Accordingly, the shielding wall 226 is grounded, so that the shielding effect between the first and second clip pins 210*a* and 210*b* can be further improved.

The elastic portion 240 is made of metal or a shielding resin material and is partially formed in a plate shape with elasticity. The elastic portion 240 is attached along a portion of the surface of the receptacle base 220 that faces the shield cans 120 and 130 and the plug shell 150 of the plug connector 100. The elastic portion 240 minimizes the gap between the plug connector 100 and the receptacle base 220 when they are coupled to each other, thereby improving shielding performance. Also, the elastic portion 240 may include a plurality of cut elastic pieces at a portion facing the shield cans 120 and 130 and the plug shell 150 of the plug connector 100. The elastic pieces 241 may increase contact force between the plug connector 100, the elastic portion 240, and the receptacle base 220, thereby further improving shielding performance.

To firmly connect the plug connector 100 and the receptacle connector 200, the receptacle base 220 may include a plurality of coupling grooves 224 and 225 on the front and lateral surfaces thereof and the plug shell 150 may include elastic coupling portions 154 and 155 on the front and lateral surfaces thereof to correspond to the coupling grooves 224 and 225. Thus, when the plug connector 100 and the receptacle connector 200 are coupled to each other, the elastic coupling portions 154 and 155 can be elastically inserted into the coupling grooves 224 and 225.

Figure 4A:
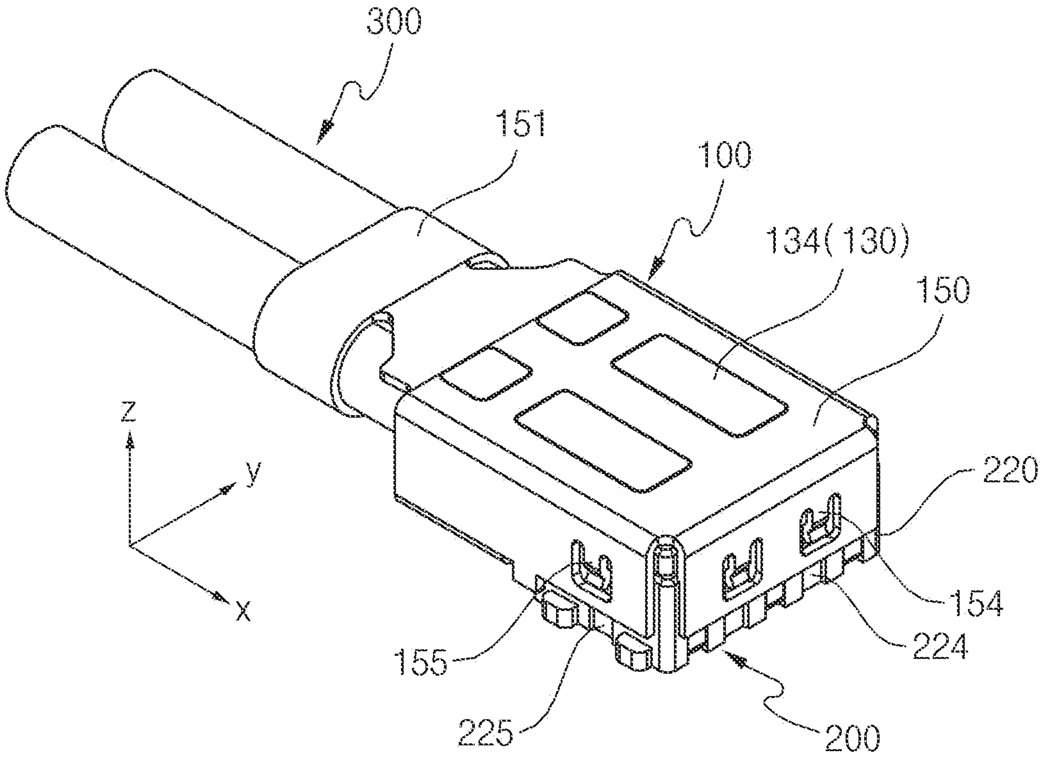
FIG. 4A is a perspective view of one side of a connector assembly in which a plug connector and a receptacle connector are coupled to each other.
Figure 4B:
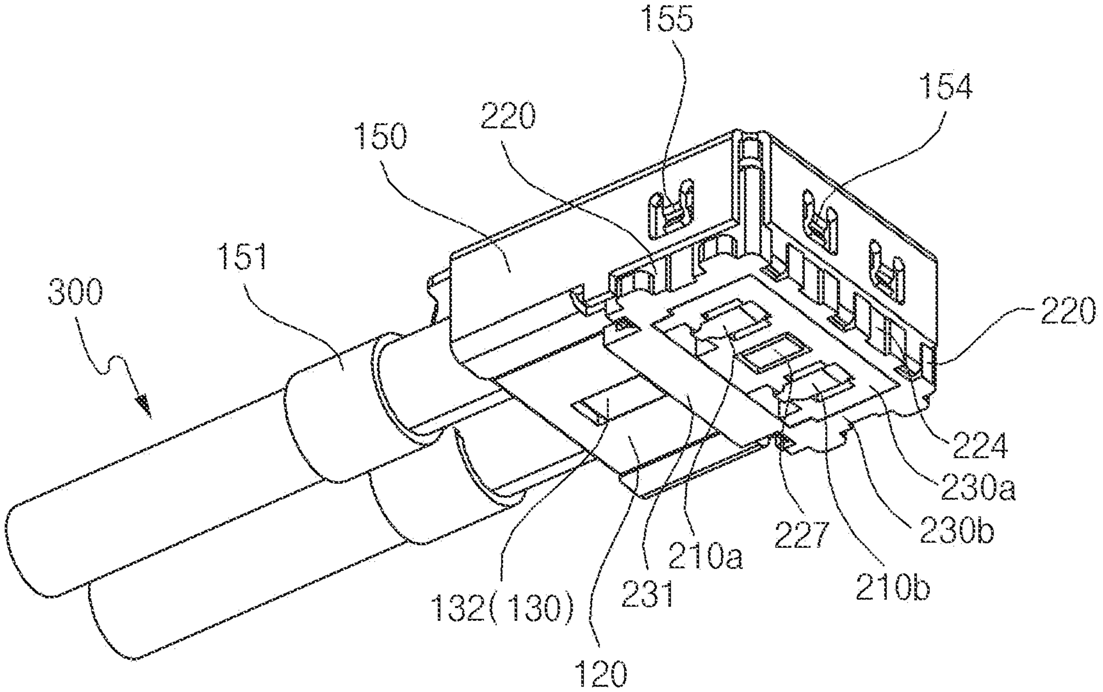
FIG. 4B is a perspective view of the connector assembly of FIG. 4A as viewed from another side.
Figure 4C:
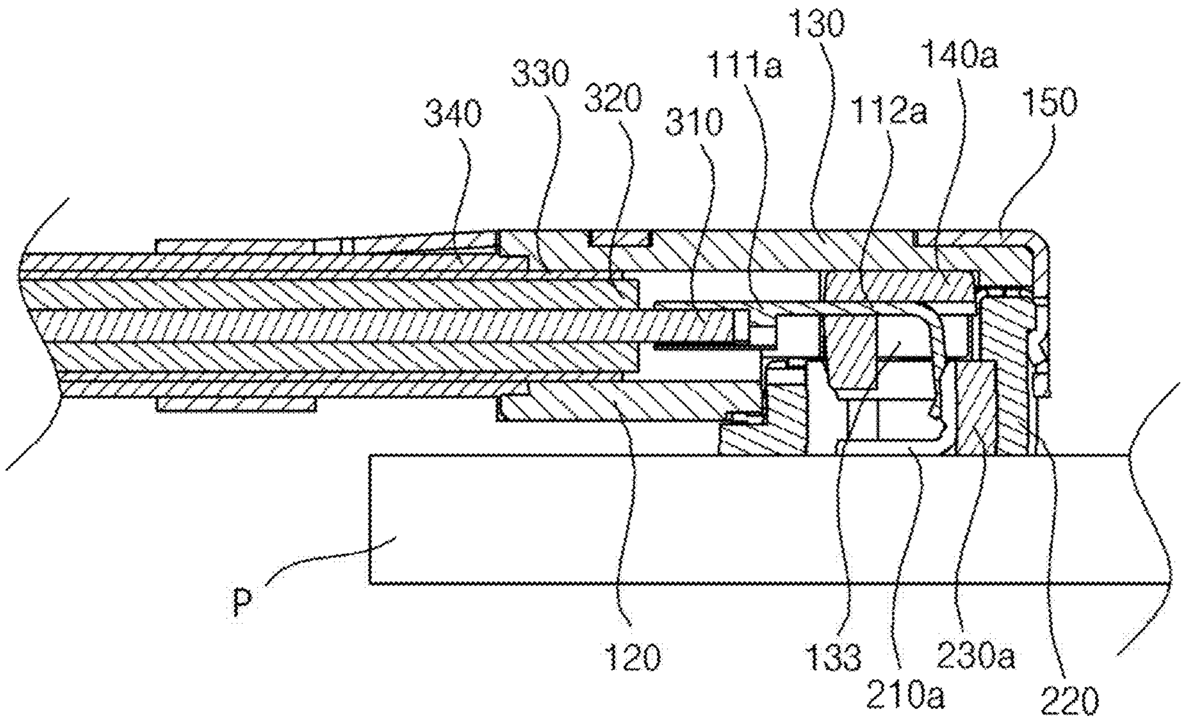
FIG. 4C is a cross-sectional view of the connector assembly of FIG. 4A.

FIGS. 4A to 4C are views of a connector assembly in which the plug connector 100 and the receptacle connector 200 are coupled to each other. FIG. 4A is a perspective view of the connector assembly in which the plug connector 100 and the receptacle connector 200 are coupled to each other, as viewed from the upper front side thereof. FIG. 4B is a perspective view of the connector assembly in which the plug connector 100 and the receptacle connector 200 are coupled to each other, as viewed from the lower front side thereof. FIG. 4C is a cross-sectional view of the connector assembly in which the plug connector 100 and the receptacle connector 200 are coupled to each other.

Referring to FIG. 4C, the front portion 112*a* of the first signal pin 110*a* and the upper portion of the first clip pin 210*a* are in elastic contact with each other. The signal line 310 and the first signal pin 110*a* are primarily shielded by the shield cans 120 and 130 and secondarily shielded by the plug shell 150. The first clip pin 210*a* is shielded by the receptacle base 220.

A number of exemplary embodiments have been particularly shown and described with reference to certain exemplary embodiments thereof. It will be understood by one of ordinary skill in the art that various changes in form and details may be made therein without departing from the spirit and scope of the exemplary embodiments as defined by the following claims. The exemplary embodiments should be considered in a descriptive sense only and not for purposes of limitation. Therefore, the scope of the exemplary embodiments is defined not by the detailed description of the exemplary embodiments but by the following claims, and all differences within the scope will be construed as being included in the exemplary embodiments.

INDUSTRIAL APPLICABILITY

The present invention can be efficiently applied in the field of manufacturing and developing electrical connectors.

The invention claimed is:

1. A connector assembly comprising a receptacle connector and a plug connector vertically coupled to the receptacle connector, the plug connector comprising:

a signal pin having one side in electrical contact with a signal line of a cable and the other side in elastic contact with a clip pin of the receptacle connector;

a shield can formed to enclose the signal pin such that the other side of the signal pin is exposed downward and electrically spaced apart from the signal pin;

a first insulating member coupled to the signal pin to insulate between the signal pin and the shield can; and a plug shell which has an open lower portion and encloses an upper surface and a side surface of the shield can to expose the other side of the signal pin downward, the receptacle connector comprising:

a clip pin which has a lower portion in contact with a signal pad of a circuit board and an upper portion in elastic contact with the other side of the signal pin;

a receptacle base which is formed to be installed on the circuit board and provides a space in which the clip pin is accommodated; and a second insulating member to which the clip pin is coupled and which encloses the side surfaces of the clip pin to insulate between the clip pin and the receptacle base, wherein the shield can comprises:

a lower shield can having a lower seating groove that forms a space in which a lower portion of the cable is seated and the one side of the signal pin is disposed; and an upper shield can having an upper seating groove in which an upper portion of the cable is seated and which forms, together with the lower seating groove, a space in which the one side of the signal pin is disposed, wherein:

the signal pin comprises first and second signal pins arranged in parallel with each other, the first insulating member comprises 1-1st and 1-2nd insulating members respectively corresponding to the first and second signal pins, the lower seating groove comprises first and second lower seating grooves respectively corresponding to the first and second signal pins, and the upper seating groove comprises first and second upper seating grooves respectively corresponding to the first and second lower seating grooves.

2. The connector assembly of claim 1, wherein:

the lower shield can comprises a vertical through hole disposed between the first and second lower seating grooves, and the upper shield can comprises a first protruding portion that protrudes downward to be inserted into the through hole.

3. The connector assembly of claim 1, wherein the upper shield can comprises a second protruding portion that protrudes downward to be disposed between the other side of the first signal pin and the other side of the second signal pin.

4. The connector assembly of claim 1, wherein:

the clip pin comprises first and second clip pins respectively corresponding to the first and second signal pins, the second insulating member comprises 2-1st and 2-2nd insulating member respectively corresponding to the first and second clip pins, and the receptacle base comprises a shielding wall disposed between the 2-1st and 2-2nd insulating members.

5. The connector assembly of claim 4, wherein the shielding wall is formed such that a lower surface thereof is in electrical contact with a ground pad of the circuit board.

6. A plug connector vertically coupled to a receptacle connector, the plug connector comprising:

a signal pin having one side in electrical contact with a signal line of a cable and the other side in elastic contact with a clip pin of the receptacle connector;

a shield can formed to enclose the signal pin such that the other side of the signal pin is exposed downward and electrically spaced apart from the signal pin;

a first insulating member coupled to the signal pin to insulate between the signal pin and the shield can; and a plug shell which has an open lower portion and encloses an upper surface and a side surface of the shield can to expose the other side of the signal pin downward, wherein the shield can comprises:

a lower shield can having a lower seating groove that forms a space in which a lower portion of the cable is seated and the one side of the signal pin is disposed; and an upper shield can having a seating groove in which an upper portion of the cable is seated and which forms, together with the lower seating groove, a space in which the one side of the signal pin is disposed, wherein:

the signal pin comprises first and second signal pins arranged in parallel with each other, the first insulating member comprises 1-1st and 1-2nd insulating members respectively corresponding to the first and second signal pins, the lower seating groove comprises first and second lower seating grooves respectively corresponding to the first and second signal pins, and the upper seating groove comprises first and second upper seating grooves respectively corresponding to the first and second lower seating grooves.

7. The plug connector of claim 6, wherein:

the lower shield can comprises a vertical through hole disposed between the first and second lower seating grooves, and the upper shield can comprises a first protruding portion that protrudes downward to be inserted into the through hole.

8. The plug connector of claim 6, wherein the upper shield can comprises a second protruding portion that protrudes downward to be disposed between the other side of the first signal pin and the other side of the second signal pin.

* * * * *